United States Patent
Zhou et al.

(10) Patent No.: US 9,986,584 B1
(45) Date of Patent: May 29, 2018

(54) CROSS-TTI LOOK-BACK SCHEDULING

(71) Applicant: Sprint Spectrum L.P., Overland Park, KS (US)

(72) Inventors: Yu Zhou, Herndon, VA (US); Muhammad A. Naim, Sterling, VA (US); Luca Zappaterra, Arlington, VA (US); David Mcgrath, Golden, CO (US)

(73) Assignee: Sprint Spectrum L.P., Overland Park, KS (US)

( * ) Notice: Subject to any disclaimer, the term of this patent is extended or adjusted under 35 U.S.C. 154(b) by 150 days.

(21) Appl. No.: 14/848,245

(22) Filed: Sep. 8, 2015

(51) Int. Cl.
*H04W 72/04* (2009.01)
*H04L 5/00* (2006.01)
*H04W 72/12* (2009.01)

(52) U.S. Cl.
CPC ....... *H04W 72/1289* (2013.01); *H04L 5/0007* (2013.01); *H04L 5/0092* (2013.01); *H04W 72/0446* (2013.01)

(58) Field of Classification Search
CPC .... H04L 5/005–5/0058; H04L 5/0091–5/0098
See application file for complete search history.

(56) References Cited

U.S. PATENT DOCUMENTS

| 2014/0328260 | A1 | 11/2014 | Papasakellariou et al. |
| 2015/0341818 | A1* | 11/2015 | Han ............... H04W 72/042 370/252 |
| 2016/0234857 | A1* | 8/2016 | Chen ............... H04W 72/1231 |
| 2017/0041119 | A1* | 2/2017 | Ang ............... H04L 5/14 |
| 2017/0164384 | A1 | 6/2017 | Wang et al. |

* cited by examiner

*Primary Examiner* — Marcus R Smith

(57) ABSTRACT

Disclosed is a method and apparatus to help manage data communication in a manner that increases downlink capacity. As disclosed, a base station may transmit, in a downlink traffic channel of a given sub-frame, bearer data to a particular wireless communication device (WCD). After transmitting the bearer data, the base station may transmit, in the downlink control channel of another sub-frame, a signaling message that directs the particular WCD to read the previously transmitted bearer data. The signaling message may include an indication of the given sub-frame having the previously transmitted bearer data. When the WCD receives and reads the signaling message, the WCD may use the indication as a basis to read the previously transmitted bearer data in accordance with the signaling message.

20 Claims, 8 Drawing Sheets

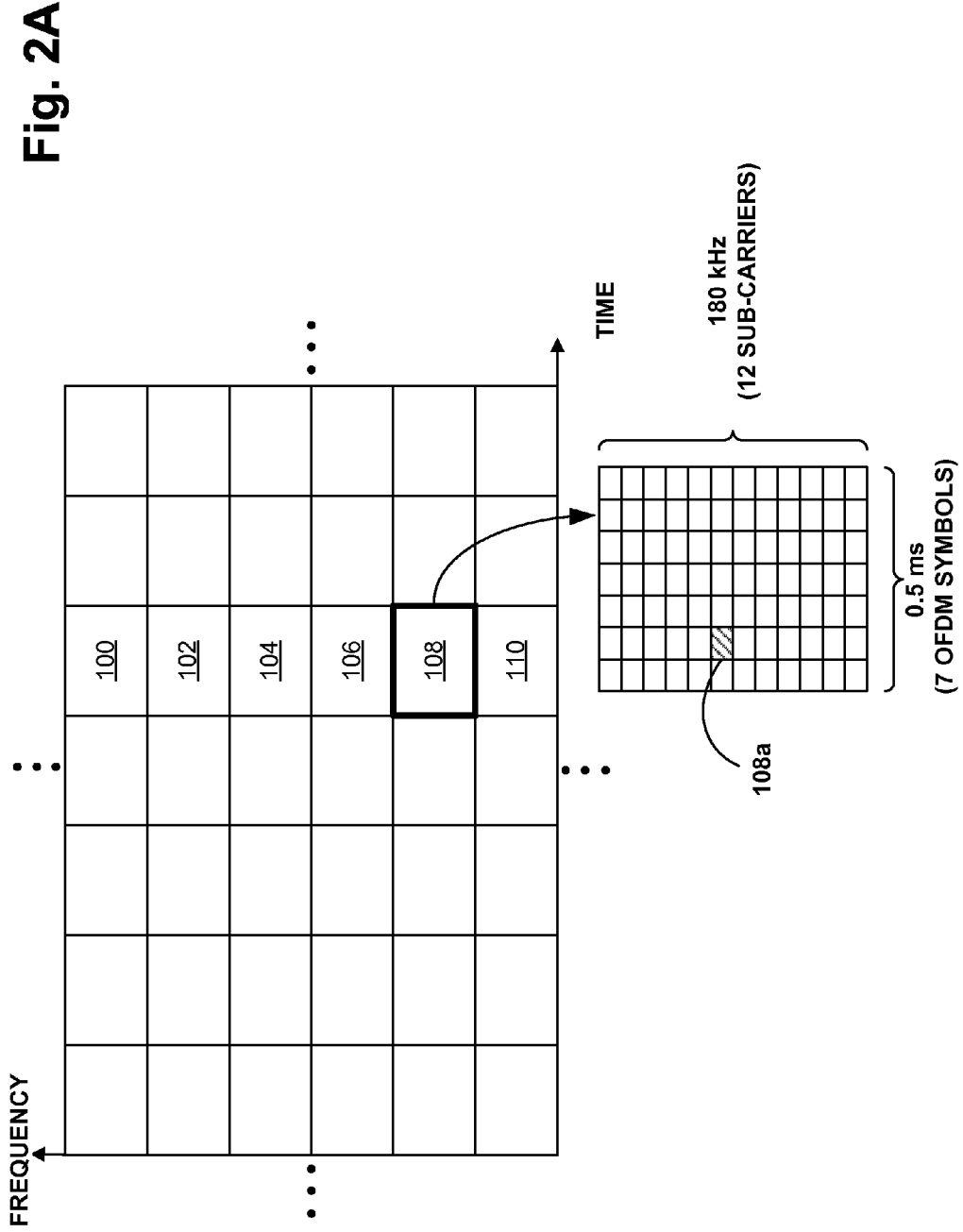

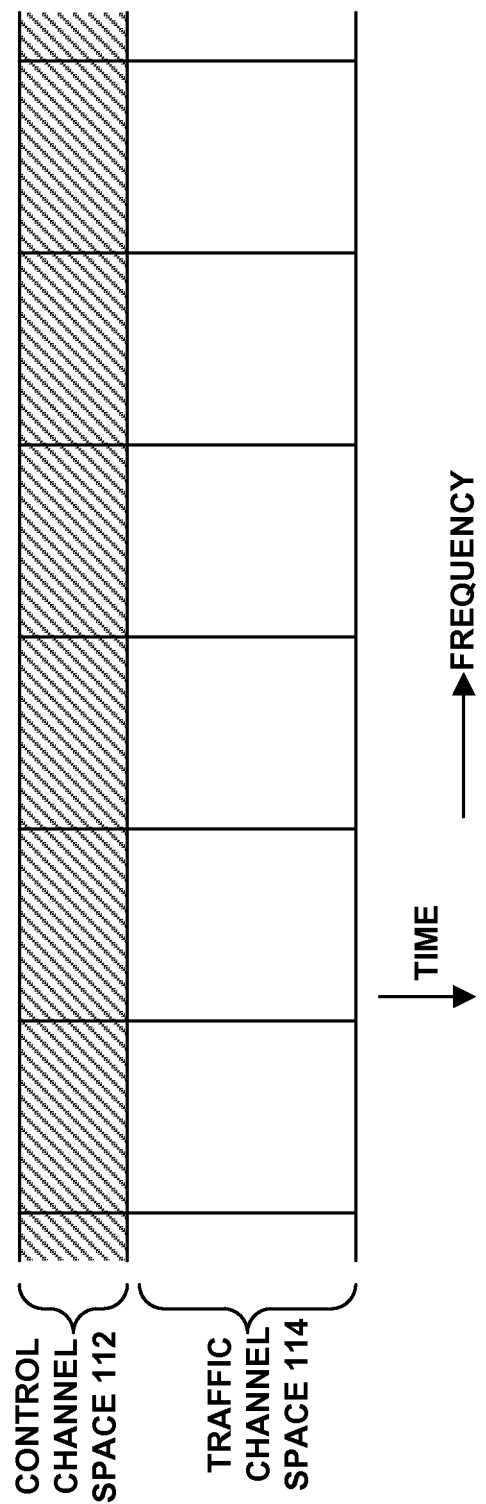

CROSS-TTI LOOK-BACK SCHEDULING

BACKGROUND

In a wireless communication system, a base station may provide one or more coverage areas, such as cells or sectors, in which the base station may service wireless communication devices (WCDs), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to WCDs and an uplink for carrying communications from WCDs to the base station. The downlink and uplink may operate on separate carriers or may be time division multiplexed over the same carrier(s). Further, the air interface may define various channels for carrying communications between the base station and WCDs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to WCDs, and a Physical Downlink Control Channel (PDCCH) for carrying control signaling from the base station to WCDs. Further, on each such carrier used for uplink communications, the air interface defines a Physical Uplink Shared Channel (PUSCH) as a primary channel for carrying data from WCDs to the base station, and a Physical Uplink Control Channel (PUCCH) for carrying control signaling from WCDs to the base station.

In LTE, downlink air interface resources are mapped in the time domain and in the frequency domain. In the time domain, LTE defines a continuum of 10-millisecond (ms) frames, divided into 1-ms sub-frames and 0.5-ms slots. With this arrangement, each sub-frame is considered to be a transmission time interval (TTI). Each frame has 10 sub-frames (or TTIs), and each sub-frame has 2 slots. In the frequency domain, on the other hand, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one slot (0.5 ms). In the frequency domain, each downlink resource block consists of 12 sub-carriers that are used together to form OFDM symbols. Typically, the 0.5 ms duration of a downlink resource block accommodates 7 OFDM symbols, each spanning 66.7 microseconds, with a 4.69-microsecond guard band (cyclic prefix) added to help avoid inter-symbol interference. Depending on the bandwidth of the downlink carrier, the air interface may support transmission on a number of such downlink resource blocks in each slot. For instance, a 5 MHz carrier supports 25 resource blocks in each slot, whereas a 15 MHz carrier supports 75 resource blocks in each slot.

The smallest unit of downlink resources is the resource element. Each resource element corresponds to one sub-carrier and one OFDM symbol. Thus, a resource block that consists of 12 sub-carriers and 7 OFDM symbols has 84 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 15 Quadrature Amplitude Modulation (16QAM), each modulation symbol may represent 4 bits; and with 64QAM, each modulation symbol may represent 6 bits.

Within a resource block, and cooperatively across all of the resource blocks of the carrier bandwidth, different resource elements can have different functions on the downlink. In particular, certain resource elements (e.g., 8 resource elements distributed throughout the resource block) may be reserved for reference signals used for channel estimation. In addition, certain resource elements (e.g., resource elements in the first one, two, or three OFDM symbols per TTI) may be reserved for the PDCCH and other control channels (e.g., a physical hybrid automatic repeat request channel (PH-ICH)), and most of the remaining resource elements (e.g., most of the resource elements in the remaining OFDM symbols per TTI) would be left to define the PDSCH.

Across the carrier bandwidth, each TTI of the LTE air interface thus defines a control channel space that generally occupies a certain number of 66.7-microsecond symbol time segments (e.g., the first one, two, or three such symbol time segments), and a PDSCH space that generally occupies the remaining symbol time segments, with certain exceptions for particular resource elements. With this arrangement, in the frequency domain, the control channel space and PDSCH space both span the entire carrier bandwidth. In practice, the control channel space is then treated as being a bandwidth-wide space for carrying control signaling to WCDs. Whereas, the PDSCH is treated as defining discrete 12-sub-carrier-wide PDSCH segments corresponding to the sequence of resource blocks across the carrier bandwidth.

One of the main functions of the PDCCH is to carry Downlink Control Information (DCI) messages to served WCDs. LTE defines various types or "formats" of DCI messages, to be used for different purposes, such as to indicate how a WCD should receive data in the PDSCH of the same sub-frame, or how the WCD should transmit data on the PUSCH in an upcoming sub-frame. For instance, a DCI message in a particular sub-frame may schedule downlink communication of bearer data to a WCD, by specifying one or more particular resource blocks that carry the bearer data in the sub-frame's PDSCH, what modulation scheme is used for the downlink transmission, and so forth.

Each DCI message may span a particular set of resource elements on the PDCCH (e.g., one, two, four, or eight control channel elements (CCEs), each including 36 resource elements) and may include a cyclic redundancy check (CRC) that is masked (or scrambled) with an identifier (e.g., a particular radio network temporary identifier (RNTI)). In practice, a WCD may monitor the PDCCH in each sub-frame in search of a DCI message having one or more particular RNTIs. And if the WCD finds such a DCI message, the WCD may then read that DCI message and proceed as indicated. For instance, if the DCI message schedules downlink communication of bearer data to the WCD on particular PDSCH resources in the current sub-frame, the WCD may then read the indicated PDSCH resources to receive that bearer data.

OVERVIEW

In a system as described above, a base station may be configured for scheduling downlink communication of bearer data to WCDs. For instance, a base station may include a medium access control (MAC) scheduler which is arranged to allocate downlink resources amongst traffic flows with various WCDs. In practice, the MAC scheduler may allocate resource blocks to WCDs at the TTI (or sub-frame) level. In each TTI, the MAC scheduler may assign downlink resources to WCDs based on one or more factors, such as quality of service (QoS) attributes and PDSCH resource availability.

Further, in such a system, an overall capacity of the downlink may depend on various factors, such as PDCCH capacity and PDSCH capacity, for instance. If either the PDCCH or the PDSCH of a particular sub-frame becomes congested, the MAC scheduler may be unable to schedule any more downlink data for transmission in that particular sub-frame. As a particular example, during the course of assigning resources for a particular sub-frame, the MAC scheduler may allocate various resource blocks in the PDCCH of the particular sub-frame for carrying DCI messages to various WCDs, with each of the DCI messages specifying one or more particular resource blocks that carry bearer data in the sub-frame's PDSCH. When the number of DCI messages exceeds a threshold, such that the PDCCH of the particular-subframe is fully utilized, the MAC scheduler may be unable to schedule any additional downlink communication of bearer data for transmission in the PDSCH of the particular sub-frame.

Unfortunately, however, in such a scenario, there may still be excess capacity in the PDSCH of the particular sub-frame. The excess capacity in the PDSCH of the particular sub-frame is essentially squandered or wasted though, since the MAC scheduler does not schedule any additional downlink communication of bearer data once the PDCCH is fully utilized. Moreover, under "bursty" network traffic conditions in which network traffic is variable over time (e.g., due to Internet browsing), the amount of wasted or unused resources in the PDSCH could be substantial.

Disclosed herein are methods and corresponding systems to help manage data communication in a manner that may increase downlink capacity. In accordance with this disclosure, when, for example, a downlink control channel of a given sub-frame is threshold highly congested, but extra capacity exists in a downlink traffic channel of the given sub-frame, the base station may transmit, in the downlink traffic channel of the given sub-frame, bearer data to a particular WCD. After transmitting the bearer data in the given sub-frame, the base station may then transmit, in the downlink control channel of another sub-frame, a signaling message that directs the particular WCD to read the previously transmitted bearer data. In this manner, upon receiving the signaling message, the signaling message may cause the particular WCD to then "look-back" and read the bearer data that was previously transmitted in the given sub-frame.

In one implementation, for instance, the particular WCD may maintain a sub-frame data buffer containing sub-frame data previously received from the base station. Further, the signaling message may include an indication of the given sub-frame, such as an offset that is indicative of a number of sub-frames by which the given sub-frame and the other sub-frame having the signaling message are offset from each other. Accordingly, when the particular WCD receives the signaling message, the particular WCD may use the indication in the signaling message as a basis to read, from the sub-frame data buffer, the previously received bearer data.

In another implementation, for instance, the other sub-frame having the signaling message may immediately follow the given sub-frame. Further, the signaling message may comprise a Boolean flag that indicates to the particular WCD that the signaling message identifies bearer data in the downlink traffic channel of the sub-frame defined immediately before the other sub-frame. Accordingly, upon receiving the signaling message, the signaling message may cause the particular WCD to read the bearer data transmitted in the downlink traffic channel of the sub-frame defined immediately before the sub-frame having the signaling message.

Accordingly, in one respect, disclosed is a method for managing data communication in a radio access network. In accordance with the method, a cellular base station provides a wireless coverage area that defines an air interface, with the air interface defining, over time, downlink sub-frames each having a downlink control channel and each having a downlink traffic channel. Further, the cellular base station transmits, in the downlink traffic channel of a given one of the sub-frames, bearer data to a particular WCD served by the cellular base station. Still further, after transmitting the bearer data in the given sub-frame, the cellular base station subsequently transmits, in the downlink control channel of another one of the sub-frames, a signaling message that directs the particular WCD to read the previously transmitted bearer data. The signaling message may include an indication of the given sub-frame.

In another respect, disclosed is a method for processing received data. In accordance with the method, the WCD operates in a wireless coverage area served by a cellular base station, with the wireless coverage area defining an air interface, and the air interface defining, over time, downlink sub-frames each having a downlink control channel and each having a downlink traffic channel. Further, the WCD wirelessly receives, in the downlink traffic channel of a given one of the sub-frames, bearer data transmitted from the cellular base station to the WCD. Still further, after receiving the bearer data in the given sub-frame, the WCD subsequently receives, in the downlink control channel of another one of the sub-frames, a signaling message transmitted from the cellular base station to the WCD, with the signaling message including an indication of the given sub-frame. And the WCD uses the indication in the signaling message as a basis to read the previously received bearer data in accordance with the signaling message.

In yet another respect, disclosed is a WCD. The WCD includes a wireless communication interface for engaging in communication with a base station over an air interface, with the air interface defining, over time, downlink sub-frames each having a downlink control channel and each having a downlink traffic channel. Further, the WCD includes a controller for processing communications that the wireless communication interface receives from the base station. According to the disclosure, the controller detects, in the downlink control channel of a given one of the sub-frames, a signaling message transmitted from the base station to the WCD, with the signaling message including an indication of another one of the sub-frames preceding the given sub-frame. Further, the controller uses the indication in the signaling message as a basis to read bearer data previously received from the base station by the WCD in the downlink traffic channel of the other sub-frame.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2A is a conceptual illustration of a division of a shared downlink channel into downlink resource blocks, in accordance with an example embodiment.

FIG. 2C is a conceptual illustration of a segment of a downlink sub-frame on one carrier, depicting a relationship between a downlink control channel and a downlink traffic channel.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
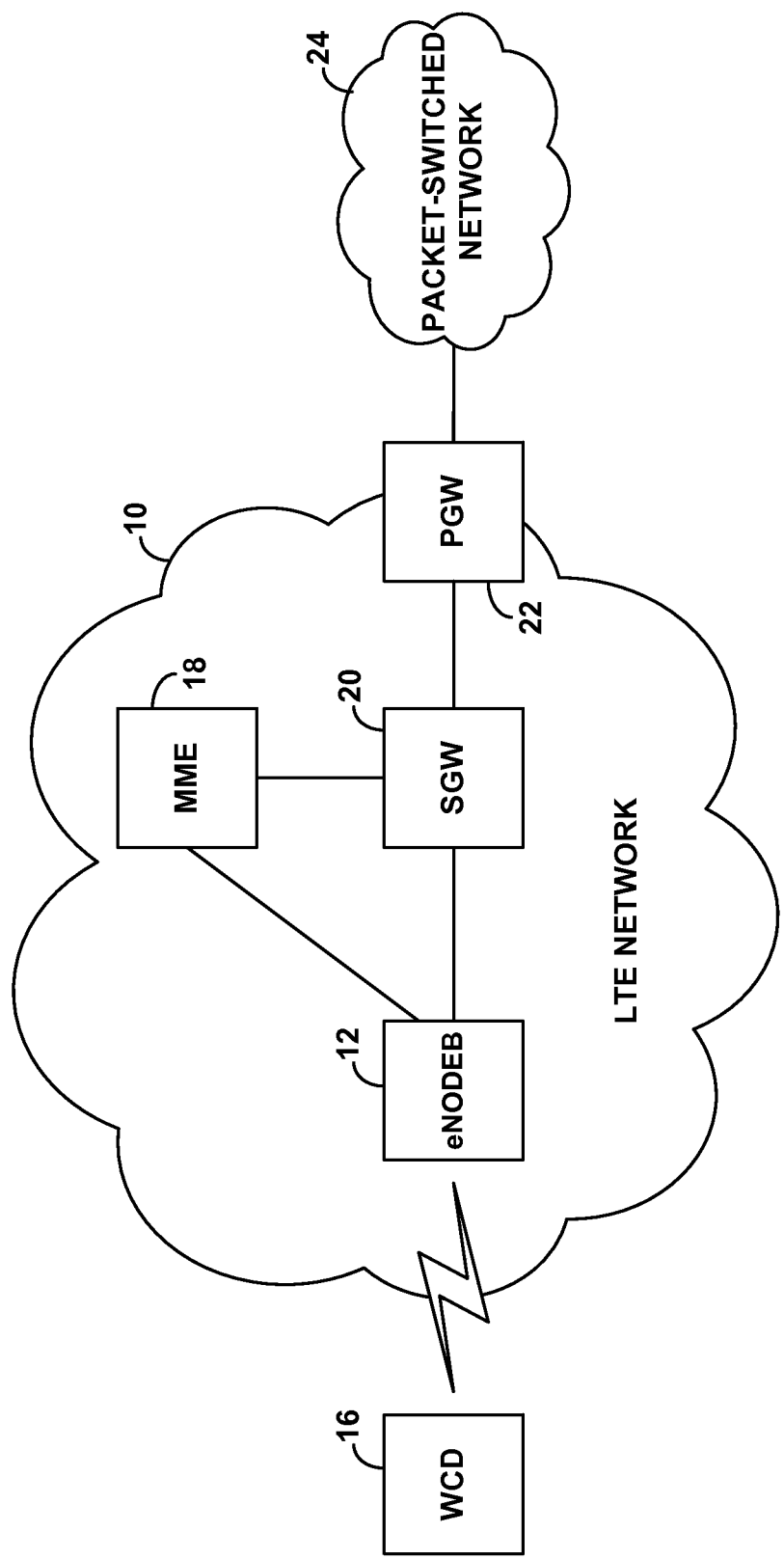
FIG. 1 is a simplified block diagram of a wireless communication system in which the present method and apparatus can be implemented.

Referring to the drawings, as noted above, FIG. 1 is a simplified block diagram of a wireless communication system in which the present method and apparatus can be implemented. In particular, FIG. 1 depicts a representative LTE network 10, which functions primarily to serve UEs with wireless packet data communication service, including possibly VoIP service, but may also provide other functions. As shown, the LTE network includes an eNodeB 12, which has an antenna structure and associated equipment for providing an LTE coverage area 14 in which to serve WCDs such as an example WCD 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be virtual interfaces through that network.

With this network arrangement as shown, WCD 16 may be attached with eNodeB 12 on a particular carrier and may have one or more established bearers for carrying data between the WCD and packet-switched network 24. For instance, the WCD may have a best-efforts bearer and an IMS signaling bearer, among possibly others. Each such bearer may extend between the WCD and the PGW 22, including a radio-bearer portion extending over the air between the WCD and the eNodeB, and an access bearer portion extending via the SGW 20 between the eNodeB and the PGW 22.

In line with the discussion above, the LTE coverage area 14 may define an air interface providing a downlink for carrying communications from the eNodeB 12 to WCDs. FIG. 2A illustrates how the downlink resources in a given wireless coverage area may be divided in time and frequency domains into resource blocks under LTE. In the time domain, each resource block occupies a 0.5-ms slot. By way of example, FIG. 2A shows resource blocks 100-110 for a particular slot. In the frequency domain, each of resource blocks 100-110 occupies a respective portion of frequency bandwidth, typically 180 kHz. Although FIG. 2A shows six resource blocks in each slot, a wireless coverage area could have a greater number of resource blocks, as indicated by the dots above and below resource blocks 100-110. As noted above, for instance, in a 5 MHz LTE carrier, a total of 25 resource blocks may span each 0.5-ms slot.

FIG. 2A also includes a more detailed view of downlink resource block 108. This detailed view shows that the 180 kHz of frequency bandwidth corresponds to 12 sub-carriers of 15 kHz each, and also shows that the 0.5-ms slot corresponds to the duration of 7 OFDM symbols (although the number of OFDM symbols in downlink resource block can vary). Each OFDM symbol spans the 12 sub-carriers and includes a respective sub-carrier symbol on each sub-carrier. Thus, as noted above, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource block into multiple resource elements, such as resource element 108a.

Figure 2B:
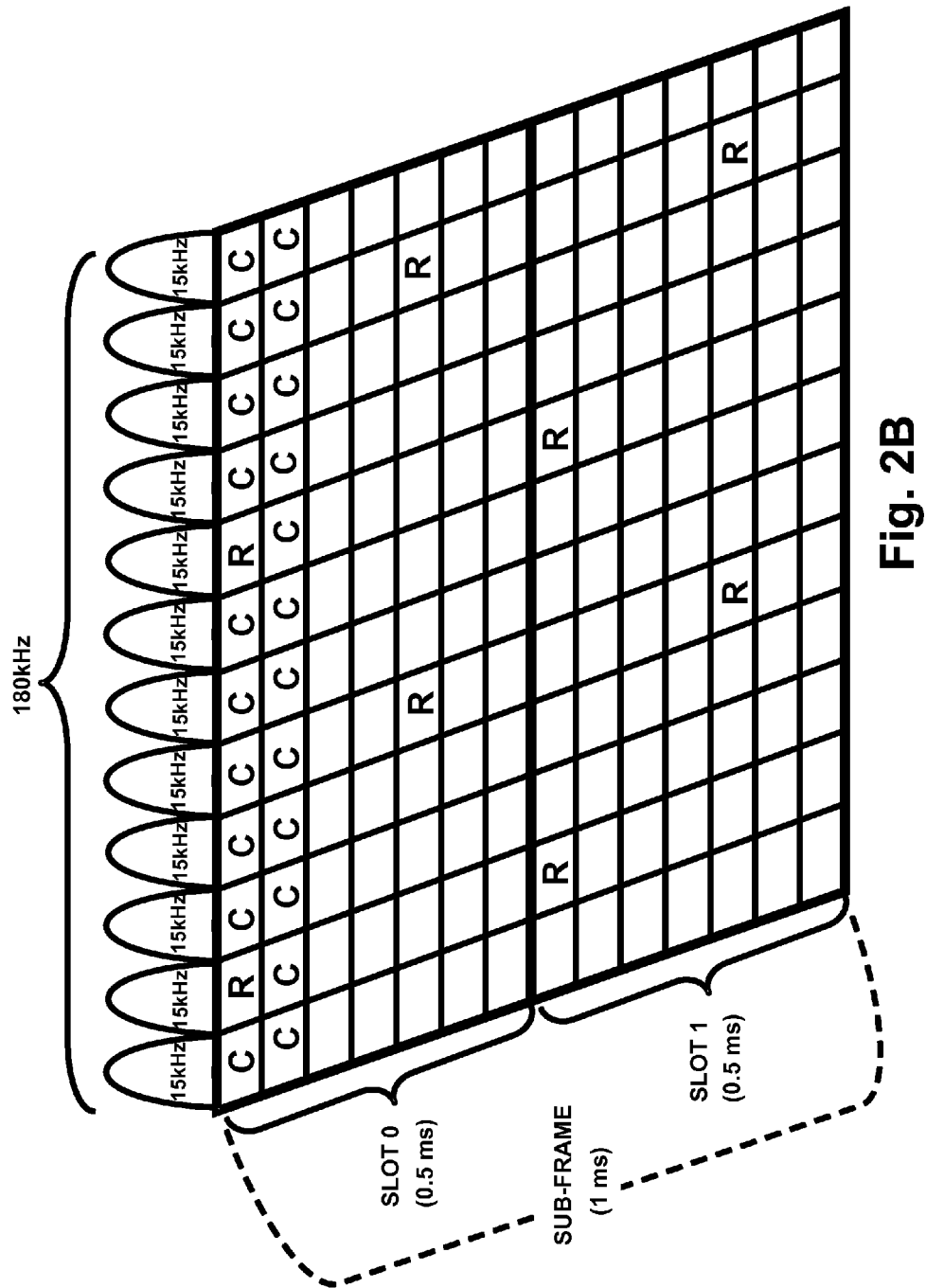
FIG. 2B is a conceptual illustration of a downlink resource block, in accordance with an example embodiment.

As further noted above, different resource elements in downlink resource blocks may be used for different purposes. FIG. 2B illustrates different functions among the 168 resource elements in an example pair of downlink resource blocks. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. FIG. 2B illustrates only one possible configuration; downlink resource blocks could have other configurations as well.

FIG. 2C next depicts a segment of an example downlink sub-frame, to help illustrate the example relationship between the PDCCH and PDSCH across the bandwidth of a representative carrier. In particular, FIG. 2C provides another view of the six example resource blocks 100-110 of FIG. 2A. As shown, a first portion of time (one or more OFDM symbol segments) of each resource block is reserved for use to define control channel space 112 that spans all of the resources blocks in the sub-frame. When a WCD is served on this carrier, the eNodeB may transmit signaling messages (e.g., DCI messages) to the WCD in the PDCCH of the control channel space 112. The remaining portion of each resource block (other than the resource elements reserved for reference symbol use or the like) is then available for use to define traffic channel space 114. When a WCD is served on this carrier, the eNodeB may transmit bearer data to the WCD in the PDSCH of the traffic channel space 114.

Figure 3A:
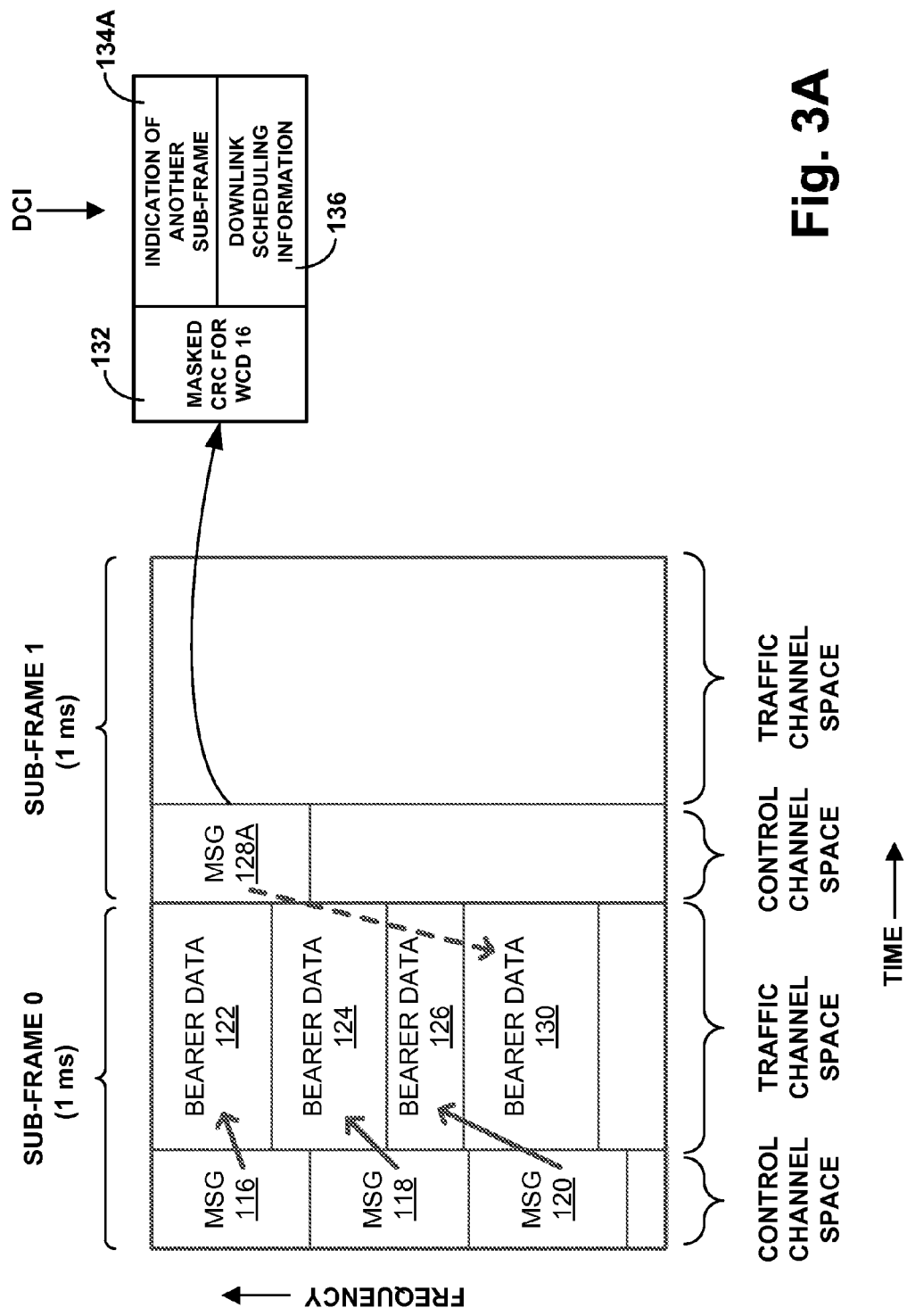
FIG. 3A is a conceptual illustration of downlink sub-frames, depicting an example signaling message that directs a WCD to read previously transmitted bearer data.

FIG. 3A next illustrates a portion of a downlink frame, showing how the control channel space (e.g., the PDCCH) in a given sub-frame may carry signaling messages to one or more WCDs, with each signaling message separately scheduling downlink communication of bearer data. In particular, this figure illustrates three example signaling messages 116, 118, 120 in a first sub-frame (sub-frame 0), although the control channel space could just as well carry more than three signaling messages in a single sub-frame. In the figure, each of the signaling messages 116, 118, 120 separately schedules downlink communication of bearer data to one or more WCDs. Specifically, as indicated by the solid arrows, the signaling messages 116, 118, 120 transmitted in the control channel space of sub-frame 0 schedule downlink communication of example bearer data 122, 124, 126, respectively, that is transmitted in the traffic channel space (e.g., the PDSCH) of sub-frame 0.

In one example, the signaling messages 116, 118, 120 may be transmitted to a first WCD, second WCD, and third WCD, respectively. For instance, each of the signaling messages 116, 118, 120, may be a DCI message including a first portion carrying a CRC masked with a RNTI of a respective WCD, and including a second portion carrying payload of the DCI message (not shown). The signaling messages 116, 118, 120 may direct the first WCD, second WCD, and third WCD, respectively, to read respective bearer data transmitted in the same sub-frame as the sub-frame in which the signaling message is transmitted (i.e., sub-frame 0). In practice, the payload portion of a DCI message that schedules allocation of PDSCH resources to a WCD may carry a DCI format value that indicates the DCI message is a type that carries PDSCH resource allocation, and the message may then carry a specification of the PDSCH resource allocation. By way of example, a DCI message may specify the allocated PDSCH resources by denoting the PDSCH resource blocks as numbered resource blocks or ranges of resource blocks. The DCI message may also specify a modulation and coding scheme, which may allow the WCD to decode the PDSCH resource blocks. The first WCD, second WCD, and third WCD may thus read the payload portion of the signaling messages 116, 118, 120, respectively, and receive the bearer data from the indicated PDSCH resources.

FIG. 3A also illustrates a fourth example signaling message 128A transmitted in the control channel space of a subsequent sub-frame (sub-frame 1). Like the signaling messages 116, 118, 120, the signaling message 128 may also schedule downlink communication of bearer data to a WCD; however, in line with the discussion above, as indicated by the dashed arrow, the signaling message 128A directs the WCD to read bearer data 130 that was transmitted in a prior sub-frame (i.e., sub-frame 0), whereas the signaling messages 116, 118, 120 direct one or more WCDs to read bearer data transmitted in the same sub-frame as the sub-frame in which the signaling message is transmitted. In FIG. 3A, the signaling message 128A is shown as a DCI message, by way of example, including a first portion 132 carrying a CRC masked with an RNTI of WCD 16, and a second portion carrying payload of the DCI message. The second portion of the DCI message is shown including both (i) an indication 134A of another sub-frame and (ii) scheduling information 136 that schedules downlink communication of the bearer data 130.

With this example arrangement, the indication 134A in the signaling message 128A could take various forms. For example, if, as depicted in FIG. 3A, the signaling message 128A is provided in the sub-frame that immediately follows the sub-frame in which the bearer data 130 is transmitted, the indication could be a simple Boolean flag that the WCD would interpret as an indication that the signaling message identifies bearer data in the traffic channel space of the sub-frame defined immediately before the sub-frame in which the signaling message 128A is located. In one configuration, the downlink scheduling information 136 could specify one or more particular resource blocks in a traffic channel space, with the indication 134A indicating to the WCD that the one or more particular resource blocks are located in the sub-frame defined immediately before the sub-frame in which the signaling message is located.

As another example, the indication 134A could be an offset that is indicative of a number of sub-frames by which the sub-frame in which the bearer data 130 is located and the sub-frame in which the signaling message 128A is located are offset from each other. If the offset were one, for instance, the WCD would then interpret the offset as an indication that the signaling message identifies bearer data in the traffic channel space of the sub-frame defined immediately before the sub-frame in which the signaling message 128A is located.

Figure 3B:
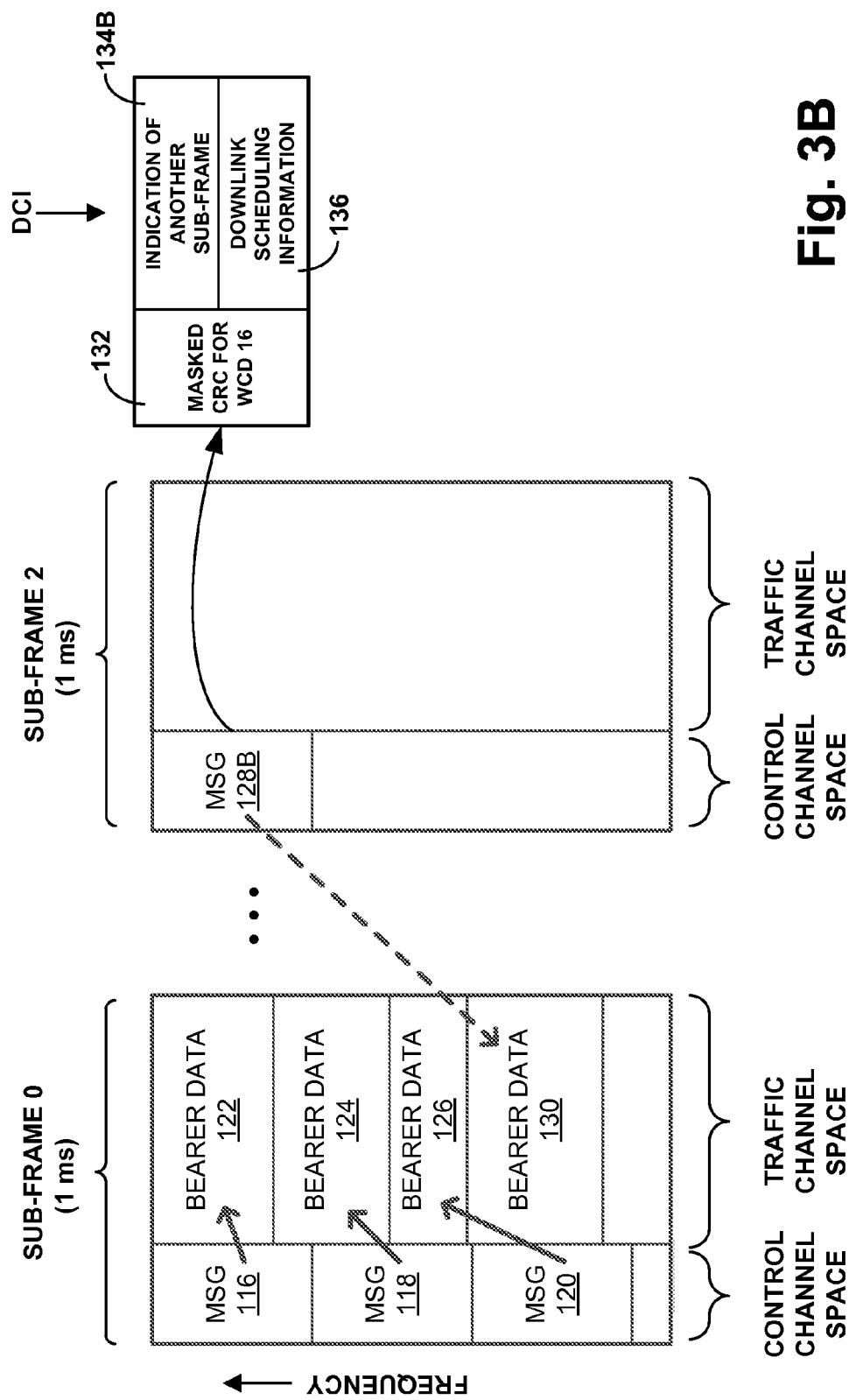
FIG. 3B is another conceptual illustration of downlink sub-frames, depicting an example signaling message that directs a WCD to read previously transmitted bearer data.

In other examples, the offset may be greater than one. For instance, FIG. 3B illustrates a portion of a downlink frame, showing how a signaling message 128B may be transmitted in a third sub-frame (sub-frame 2) of a particular frame, while the bearer data 130 is transmitted in a first sub-frame (sub-frame 0) of the particular frame. With this arrangement, an indication 134B may include an offset of two, indicating to the WCD that the signaling message 128B identifies bearer data in the sub-frame defined two sub-frames before the sub-frame in which the signaling message is located.

In accordance with the present method, the base station may include an indication (such as the indication 134A or 134B) in a particular field or place within the signaling message, and the WCD may be configured to read the indication from that place in the signaling message, and to thereby determine that the signaling messages relates to bearer data previously transmitted by the base station in another sub-frame. Thus, the base station may transmit bearer data to the WCD in the traffic channel of a given sub-frame, and then subsequently transmit a signaling message to the WCD in the traffic channel of another sub-frame, including an indication of the given sub-frame in the signaling message. In this manner, the WCD may read and use the indication as a basis to read the previously received bearer data in accordance with the signaling message.

Accordingly, aspects of the present method may be carried out by a cellular base station, such as eNodeB 12 shown in FIG. 1. In practice, such a cellular base station may provide a wireless coverage area defining an air interface, with the air interface defining, over time, downlink sub-frames each having a downlink control channel (e.g., PDCCH) and each having a downlink traffic channel (e.g., PDSCH). Further, the cellular base station may transmit, in the downlink traffic channel of a given one of the sub-frames, bearer data to a particular WCD served by the cellular base station, such as the WCD 16 shown in FIG. 1. After transmitting the bearer data in the given sub-frame, the cellular base station may subsequently transmit, in the downlink control channel of another one of the sub-frames, a signaling message that directs the particular WCD to read the previously transmitted bearer data. Further, the signaling message may include an indication of the given sub-frame that includes the previously transmitted bearer data. In line with the discussion above, including such an indication in the signaling message may thus enable the WCD to use the indication as a basis to read the previously transmitted bearer data.

In practice, the signaling message may be a DCI message. Further, as discussed above, the indication may take various forms. For instance, the indication may be an offset that is indicative of a number of sub-frames by which the given sub-frame and the other sub-frame are offset from each other, and the offset may direct the particular WCD to the given sub-frame that includes the previously transmitted bearer data. Alternatively, the other sub-frame may immediately follow the given sub-frame, and the indication in the signaling message may be a Boolean flag or other indication that indicates that the signaling message identifies bearer data in the downlink traffic channel of the sub-frame defined immediately before the other sub-frame.

Moreover, as discussed above, the cellular base station may carry out the present method when, for example, the downlink control channel of a given sub-frame is threshold highly congested. For instance, the cellular base station may make a determination that the downlink control channel of the given sub-frame is threshold highly congested and the downlink traffic channel of the given sub-frame is threshold lowly congested. Further, the cellular base station may transmit the bearer data in the downlink traffic channel of the given sub-frame in response to at least making the determination. In one example, making the determination may involve the cellular base station determining that (i) at least a threshold number of other signaling messages are scheduled for transmission to other WCDs in the downlink control channel of the given sub-frame and (ii) an extent of the downlink traffic channel of the given sub-frame that is allocated for transmitting bearer data to the other WCDs is less than a capacity of the downlink traffic channel, such that extra capacity for transmitting bearer data exists in the downlink traffic channel of the given sub-frame. Other measures of congestion could be considered as well.

Additionally, in some instances, the cellular base station may carry out the present method when, for example, the bearer data can withstand being held (e.g., buffered) for an extra sub-frame or so before being read. By way of example, the cellular base station may carry out the present method when the bearer data relates to buffered video, streaming video, or interactive gaming. For instance, the cellular base station may store a table listing data types for which the cellular base station may carry out the present method. With such an arrangement, the cellular base station may determine whether particular bearer data awaiting transmission to the WCD is one of the types listed in the table, and if so, the cellular base station may proceed to transmit the particular bearer data in the given sub-frame and then subsequently transmit a signaling message corresponding to the particular bearer data in the other sub-frame. On the other hand, if the particular bearer data is not one of the types listed in the table, the cellular base station might send the bearer data and a corresponding signaling message in the same sub-frame.

Further, aspects of the present method may also be carried out by a WCD, such as WCD 16 shown in FIG. 1. Such a WCD may operate in a wireless coverage area served by a cellular base station, where the wireless coverage area defines an air interface, and the air interface defines, over time, downlink sub-frames each having a downlink control channel and each having a downlink traffic channel. In practice, the WCD in that arrangement may wirelessly receive from the cellular base station, in the downlink traffic channel of a given one of the sub-frames, bearer data transmitted from the cellular base station to the WCD. After receiving the bearer data in the given sub-frame, the WCD may subsequently receive, in the downlink control channel of another one of the sub-frames, a signaling message transmitted from the cellular base station to the WCD. Further, the signaling message may include an indication of the given sub-frame having the previously transmitted bearer data, and the WCD may use the indication in the signaling message as a basis to read the previously received bearer data in accordance with the signaling message.

In line with the discussion above, the indication included in the signaling message may take various forms, such as an offset that is indicative of a number of sub-frames by which the given sub-frame and the other sub-frame are offset from each other. Alternatively, if the other sub-frame immediately follows the given sub-frame (or is at another predefined offset), the indication may take the form of a Boolean flag that indicates to the WCD that the signaling message identifies bearer data in the downlink traffic channel of the sub-frame defined immediately before the other sub-frame (or at a predefined offset with respect to the other sub-frame).

Moreover, as discussed above, in one example, the WCD may maintain a sub-frame data buffer containing sub-frame data previously received from the cellular base station. For instance, the sub-frame data buffer may contain sub-frame data received in the previous n sub-frames, where n is a configurable number. The sub-frame data may be stored in a first-in first-out or sliding window basis, such that as new sub-frame data is received, the sub-frame data that has been stored in the sub-frame data buffer the longest is discarded. With this example, the act of the WCD using the indication in the signaling message as a basis to read the previously received bearer data in accordance with the signaling message may then involve the WCD using the indication in the signaling message as a basis to read, from the sub-frame data buffer, the previously received bearer data in accordance with the signaling message. Further, the signaling message may be a DCI message, for instance, and the DCI message may specify one or more particular resource blocks in the downlink traffic channel of the given sub-frame that carry the bearer data. With this arrangement, the WCD may use the indication in the signaling message as a basis to read, from the sub-frame data buffer, the one or more particular resource blocks of the given sub-frame in accordance with the signaling message.

Figure 4:
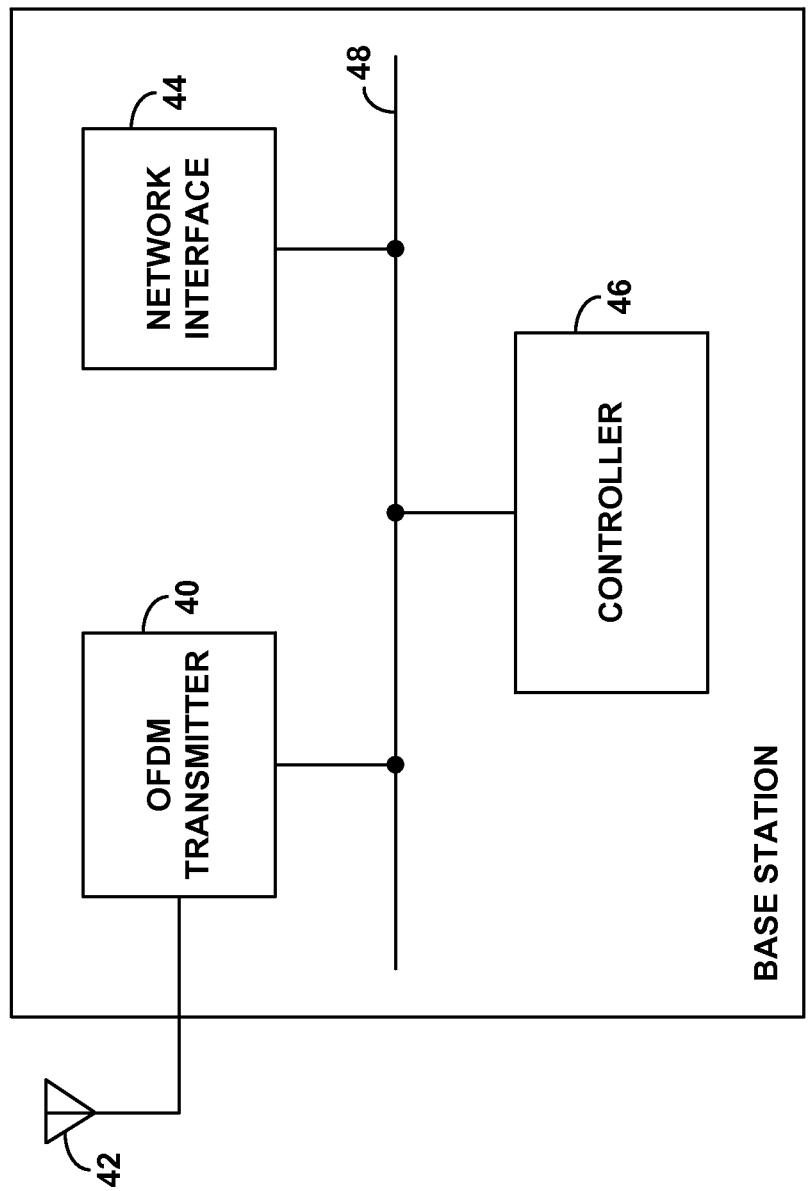
FIG. 4 is a simplified block diagram of an example base station, in accordance with an example embodiment.

FIG. 4 is next a simplified block diagram of an example cellular base station, showing some of the components of such a base station to facilitate implementation of the present method. As shown in FIG. 4, the example base station includes an OFDM transmitter (transceiver) 40 and an associated antenna structure 42, as well as a network interface 44, and a controller 46, with various ones of these or other components being communicatively linked together by a system bus, network, or other connection mechanism 48.

OFDM transmitter 40 and antenna structure 42 may function in combination to provide an OFDMA air interface as described above. As such, the OFDM transmitter 40 is configured to receive data, generate OFDM symbols from the data, and transmit the OFDM symbols on the air interface, and to define on the air interface various channels such as a PDCCH and PDSCH as discussed above. Network interface 44 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more WCDs served by the base station.

Controller 46, which may be integrated with OFDM transmitter 40 or one or more other components, may then control the transmission of data, including control and user data, on the downlink air interface. For example, controller 46 may transmit, in the downlink traffic channel of a given sub-frame, bearer data to a particular WCD served by the base station. Further, after transmitting the bearer data in the given sub-frame, controller 46 may then transmit, in the downlink control channel of another sub-frame, a signaling message that directs the particular WCD to read the previously transmitted bearer data. As discussed above, the signaling message may include an indication of the given sub-frame having the previously transmitted bearer data, and the indication may direct the particular WCD to the given sub-frame so that the particular WCD can read and read the previously transmitted bearer data in accordance with the signaling message.

Controller 46 could be implemented using hardware, software, and/or firmware. For example, controller 46 could include one or more processors and a non-transitory computer readable medium (e.g., volatile and/or non-volatile memory) that stores executable instructions. The executable instructions, when executed by the one or more processors, may cause controller 46 to perform any of the base station functions described herein.

Figure 5:
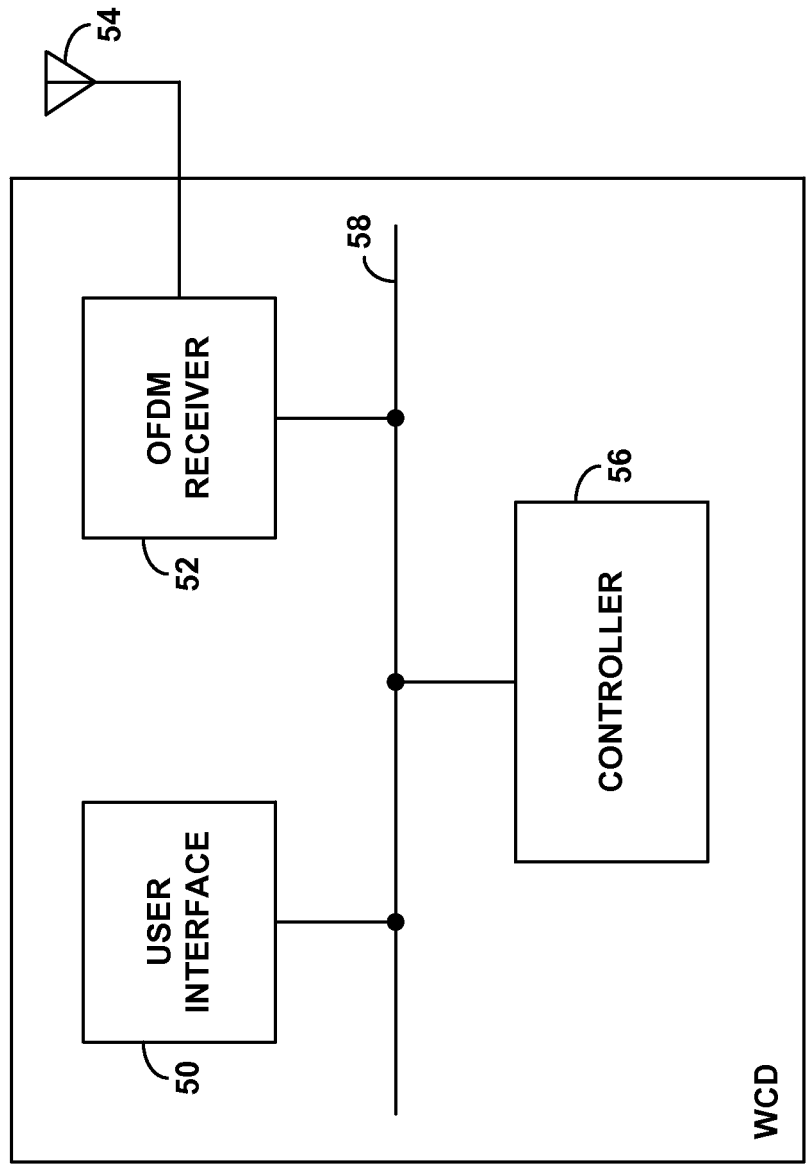
FIG. 5 is a simplified block diagram of an example WCD, in accordance with an example embodiment.

Finally, FIG. 5 is a simplified block diagram of an example WCD, showing some of the components of such a WCD to facilitate implementation of the present method. As shown in FIG. 5, the example WCD includes a user interface 50, an OFDM receiver (transceiver) 52 and an associated antenna structure 54, and a controller 56, with various ones of these or other components being communicatively linked together by a system bus, network, or other connection mechanism 58.

User interface 50 may include input and output components to facilitate interaction with a user if the WCD is a user-operable device. OFDM receiver 52 and antenna structure 54 may then function in combination to engage in OFDMA air interface communication with a cellular base station such as that described above. As such, the OFDM receiver 52 may be configured to receive OFDM communications on an air interface as described above, including for instance PDCCH communications and PDSCH communications. And controller 56, which may be integrated with OFDM receiver 52 or one or more other components, may control the processing of received communications, including control and user data.

In line with the discussion above, controller 56 may operate to detect, in the downlink control channel of a given one of the sub-frames, a signaling message transmitted from the base station to the WCD. The signaling message may include an indication of another sub-frame preceding the given sub-frame, and the controller 56 may use the indication in the signaling message as a basis to read bearer data previously received from the base station by the WCD in the downlink traffic channel of the other sub-frame. Further, as discussed above, in some examples, the controller may maintain a sub-frame data buffer containing sub-frame data previously received from the cellular base station, and the controller may use the indication in the signaling message as a basis to read, from the sub-frame data buffer, the previously received bearer data in accordance with the signaling message.

Exemplary embodiments have been described above. Those skilled in the art will understand, however, that changes and modifications may be made to these embodiments without departing from the true scope and spirit of the invention.

We claim:

1. A method for managing data communication in a radio access network, the method comprising:

providing, by a cellular base station, a wireless coverage area defining an air interface, wherein the air interface defines, over time, on a particular carrier, downlink sub-frames each having a downlink control channel and each having a downlink traffic channel, wherein the downlink sub-frames comprise a first sub-frame on the particular carrier and a second sub-frame that is subsequent to the first sub-frame on the particular carrier;

transmitting, by the cellular base station, in the downlink traffic channel of the first sub-frame, bearer data to a particular wireless communication device (WCD) served by the cellular base station; and after transmitting the bearer data in the first sub-frame, transmitting, by the cellular base station, in the downlink control channel of the second sub-frame, a signaling message that directs the particular WCD to read the previously transmitted bearer data, wherein the signaling message includes: (i) an indication of the first sub-frame and (ii) a specification of an allocation to the particular WCD of downlink traffic channel resources in the first sub-frame, wherein the specification specifies which one or more resource blocks in the first sub-frame carried the previously transmitted bearer data.

2. The method of claim 1:

wherein the indication comprises an offset that is indicative of a number of sub-frames by which the first sub-frame precedes the second sub-frame, and wherein the offset directs the particular WCD to the first sub-frame that includes the previously transmitted bearer data.

3. The method of claim 2, wherein the signaling message directs the particular WCD to read data carried in the one or more resource blocks of the downlink traffic channel of the first sub-frame.

4. The method of claim 1:

wherein the second sub-frame immediately follows the first sub-frame, and wherein the indication comprises a Boolean flag that indicates to the particular WCD that the signaling message identifies bearer data in the downlink traffic channel of the sub-frame defined immediately before the second sub-frame.

5. The method of claim 1, wherein the air interface is an Orthogonal Frequency Division Multiple Access (OFDMA) air interface.

6. The method of claim 1, further comprising:

the cellular base station making a determination that the downlink control channel of the first sub-frame is threshold highly congested and the downlink traffic channel of the first sub-frame is threshold lowly congested,
wherein the cellular base station transmits the bearer data in the downlink traffic channel of the first sub-frame in response to at least making the determination.

7. The method of claim 6, wherein the cellular base station making the determination comprises the cellular base station determining that: (i) at least a threshold number of other signaling messages are scheduled for transmission to other WCDs in the downlink control channel of the first sub-frame and (ii) an extent of the downlink traffic channel of the first sub-frame that is allocated for transmitting bearer data to the other WCDs is less than a capacity of the downlink traffic channel, such that extra capacity for transmitting bearer data exists in the downlink traffic channel of the first sub-frame.

8. The method of claim 1, wherein the signaling message comprises a Downlink Control Information (DCI) message.

9. The method of claim 8, wherein the DCI message directs the particular WCD to read data carried in the one or more resource blocks in the downlink traffic channel of the first sub-frame.

10. The method of claim 1, wherein the signaling message causes the particular WCD to read the previously transmitted bearer data.

11. A method for processing received data, the method comprising:
operating, by a wireless communication device (WCD), in a wireless coverage area served by a cellular base station, wherein the wireless coverage area defines an air interface, and wherein the air interface defines, over time, on a particular carrier, downlink sub-frames each having a downlink control channel and each having a downlink traffic channel, wherein the downlink sub-frames comprise a first sub-frame on the particular carrier and a second sub-frame that is subsequent to the first sub-frame on the particular carrier;
wirelessly receiving, by the WCD, in the downlink traffic channel of the first sub-frame, communications representing bearer data transmitted from the cellular base station to the WCD;
after receiving the communications representing the bearer data in the first sub-frame, receiving, by the WCD, in the downlink control channel of the second sub-frame, a signaling message transmitted from the cellular base station to the WCD, wherein the signaling message includes: (i) an indication of the first sub-frame and (ii) a specification of an allocation to the WCD of downlink traffic channel resources in the first sub-frame, wherein the specification specifies which one or more resource blocks in the first sub-frame carried the bearer data; and
using, by the WCD, the indication in the signaling message as a basis to read the bearer data in accordance with the signaling message.

12. The method of claim 11:
wherein the indication comprises an offset that is indicative of a number of sub-frames by which the first sub-frame precedes the second sub-frame, and
wherein the offset directs the WCD to the first sub-frame that includes the bearer data.

13. The method of claim 11:
wherein the second sub-frame immediately follows the first sub-frame, and
wherein the indication comprises a Boolean flag that indicates to the WCD that the signaling message identifies bearer data in the downlink traffic channel of the sub-frame defined immediately before the second sub-frame.

14. The method of claim 11, further comprising:
the WCD maintaining a sub-frame data buffer containing communications previously received from the cellular base station,
wherein the WCD using the indication in the signaling message as a basis to read the bearer data in accordance with the signaling message comprises the WCD using the indication in the signaling message as a basis to read, from the sub-frame data buffer, the bearer data in accordance with the signaling message.

15. The method of claim 14, wherein the signaling message comprises a Downlink Control Information (DCI) message.

16. The method of claim 15:
wherein the DCI message specifies the one or more resource blocks that carried the bearer data, and
wherein the WCD using the indication in the signaling message as a basis to read the bearer data in accordance with the signaling message comprises the WCD using the indication in the signaling message as a basis to read, from the sub-frame data buffer, the bearer data carried in the one or more resource blocks of the first sub-frame.

17. A wireless communication device (WCD) comprising:
a wireless communication interface for engaging in communication with a base station over an air interface, wherein the air interface defines, over time, on a particular carrier, downlink sub-frames each having a downlink control channel and each having a downlink traffic channel, and wherein the downlink sub-frames comprise a first sub-frame on the particular carrier and a second sub-frame that is subsequent to the first sub-frame on the particular carrier; and
a controller for processing communications that the wireless communication interface receives from the base station,
wherein the controller detects, in the downlink control channel of the second sub-frame, a signaling message transmitted from the base station to the WCD, wherein the signaling message includes: (i) an indication of the first sub-frame and (ii) a specification of an allocation to the WCD of downlink traffic channel resources in the first sub-frame, wherein the specification specifies that one or more particular resource blocks in the downlink traffic channel of the first sub-frame carried bearer data for the WCD, and
wherein the controller uses the indication in the signaling message as a basis to read the bearer data in the one or more particular resource blocks in the downlink traffic channel of the first sub-frame.

18. The WCD of claim 17:
wherein the indication comprises an offset that is indicative of a number of sub-frames by which the first sub-frame precedes the second sub-frame, and
wherein the offset directs the WCD to the first sub-frame that includes the bearer data.

19. The WCD of claim 17:
wherein the controller maintains a sub-frame data buffer containing communications previously received from the base station, and
wherein the controller using the indication in the signaling message as a basis to read the bearer data in the one or more particular resource blocks in the downlink traffic channel of the first sub-frame comprises the controller using the indication in the signaling message as a basis to read, from the sub-frame data buffer, the bearer data in accordance with the signaling message.

20. The WCD of claim 19, wherein the signaling message comprises a Downlink Control Information (DCI) message.

* * * * *